US010825088B2

(12) United States Patent
Chen et al.

(10) Patent No.: US 10,825,088 B2
(45) Date of Patent: Nov. 3, 2020

(54) CONTRACT GENERATION METHOD AND APPARATUS, SERVER AND STORAGE MEDIUM

(71) Applicant: Ping An Technology (Shenzhen) Co., Ltd., Shenzhen (CN)

(72) Inventors: Lin Chen, Shenzhen (CN); Guohui Zhang, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/339,876

(22) PCT Filed: Jun. 28, 2017

(86) PCT No.: PCT/CN2017/090570
§ 371 (c)(1),
(2) Date: Apr. 5, 2019

(87) PCT Pub. No.: WO2018/149082
PCT Pub. Date: Aug. 23, 2018

(65) Prior Publication Data
US 2020/0043090 A1    Feb. 6, 2020

(30) Foreign Application Priority Data
Feb. 17, 2017   (CN) .......................... 2017 1 0087566

(51) Int. Cl.
*G06Q 40/00*   (2012.01)
*G06Q 40/02*   (2012.01)
(Continued)

(52) U.S. Cl.
CPC ......... *G06Q 40/025* (2013.01); *G06F 40/174* (2020.01); *G06F 40/186* (2020.01); *G06Q 50/188* (2013.01)

(58) Field of Classification Search
CPC .... G06Q 40/00; G06Q 50/188; G06Q 40/025; G06Q 40/186; G06F 40/174
See application file for complete search history.

(56) References Cited

U.S. PATENT DOCUMENTS 7,430,715 B2 *  9/2008  Sullivan ................ G06F 40/197
                                                      715/255
7,640,255 B2 * 12/2009  Brookler ................. G06F 16/40
(Continued)

FOREIGN PATENT DOCUMENTS

CN   103020027 A    4/2013
CN   103577729 A    2/2014
(Continued)

OTHER PUBLICATIONS

Cortical.io Contract Intelligence Highlighted by Ovum: UK firm Underscores the Value of the Artificial Intelligence Solution PR Newswire; New York [New York]Apr. 10, 2019. (Year: 2019).*
(Continued)

*Primary Examiner* — Lalita M Hamilton
(74) *Attorney, Agent, or Firm* — Rimon PC (57) ABSTRACT

A contract generation method, comprising: acquiring order information, and acquiring a contract template corresponding to the order information; acquiring a filling domain identifier in the contract template, and acquiring a type identifier of service data corresponding to the filling domain identifier according to the correlation between a pre-set filling domain identifier and a type identifier of service data; extracting, from the order information, service data corresponding to the type identifier of service data; according to the number of characters comprised in the service data and the size of a filling domain corresponding to the filling domain identifier, determining a sub-filling area, in the corresponding filling domain of the service data; and filling the service data into the corresponding sub-filling area in the
(Continued)

contract template according to a pre-set character adjustment rule so as to generate a corresponding first contract file.

8 Claims, 7 Drawing Sheets

(51) Int. Cl.
*G06F 40/186* (2020.01)
*G06F 40/174* (2020.01)
*G06Q 50/18* (2012.01)

(56) References Cited

U.S. PATENT DOCUMENTS

| | | | |
|---|---|---|---|
| 8,655,796 B2* | 2/2014 | Udani | G16H 10/20 |
| | | | 705/342 |
| 8,972,848 B2* | 3/2015 | Oyarzabal | G06F 40/166 |
| | | | 715/229 |
| 2003/0078880 A1* | 4/2003 | Alley | G06Q 40/025 |
| | | | 705/38 |
| 2007/0157079 A1 | 7/2007 | Baker | |
| 2008/0005667 A1 | 1/2008 | Dias et al. | |
| 2015/0339285 A1* | 11/2015 | Safaei | H04L 51/18 |
| | | | 715/256 |

FOREIGN PATENT DOCUMENTS

| | | | |
|---|---|---|---|
| CN | 104503715 A | 4/2015 |
| CN | 105095168 A | 11/2015 |
| CN | 105184503 A | 12/2015 |
| CN | 103022734 A | 2/2016 |
| CN | 105787626 A | 7/2016 |
| CN | 105913219 A | 8/2016 |
| CN | 106022734 A | 10/2016 |
| CN | 102938115 B | 2/2017 |

OTHER PUBLICATIONS

International Search Report for Application No. PCT/CN2017/0909570 dated Nov. 17, 2017.
La Fenhua, et al., "Contract Generation and data extraction program for Web environment based on SOA Office Middleware," Journal of Computer Applications, vol. 32, Issue S1, Jul. 10, 2012, pp. 73-76. English Abstract Attached.
Griffel, F., et al., "Electronic Contracting with COSMOS—how to establish, negotiate, and execute electronic contacts on the Internet," Second International Enterprise Distributed Object Computing Workshop, Aug. 6, 2002, pp. 46.55.
National Intellectual Property Administration of the P. R. China, First Office Action for Chinese Application No. 201710087566.6, dated Nov. 14, 2017.
National Intellectual Property Administration of the P. R. China, Notification to Grant Patent Right for Invention for Chinese Application No. 201710087566.6, dated Dec. 21, 2017.

* cited by examiner

CONTRACT GENERATION METHOD AND APPARATUS, SERVER AND STORAGE MEDIUM

CROSS-REFERENCE TO RELATED APPLICATION

This application is the US national phase application of the international application PCT/CN2017/090570 filed on Jun. 28, 2017 and titled Contract Generation Method and Apparatus, Server and Storage Medium, which claims priority to Chinese Patent Application No. 2017100875666, entitled "GENERATION METHOD AND APPARATUS OF CONTRACT" filed Feb. 17, 2017, the content of which is both applications being expressly incorporated by reference herein in its entirety

TECHNICAL FIELD

The present disclosure relates to the field of computer technology, and in particular, to a generation method and a generation apparatus of a contract, a server, and a storage medium.

BACKGROUND

With the development of science and technology, the formation of a contract becomes more and more automatic.

In the conventional method, contract templates are provided in a contract management platform, and when a contract is to be generated, the business data in the order is filled in a contract template.

However, since in the traditional filling of the business data based on the contract template, the starting position of the business data (for example, the row, the column, or the pixel to start) and the number of words of the filling are preset. When the number of words or the like of the business data to be filled changes, the problem of misalignment is likely to happen. Therefore, it is necessary to set different contract templates according to the starting position of the filling and the number of words of the filling, resulting that there are too many contract templates and the use rate of the contract templates is relatively low.

SUMMARY

According to various embodiments, a generation method and a generation apparatus of a contract, a server, and a storage medium are provided.

A generation method of a contract includes:
obtaining order information and obtaining a contract template corresponding to the order information;
obtaining a filling field identifier in the contract template, and obtaining a type identifier of business data corresponding to the filling field identifier according to a preset correspondence relationship between the filling field identifier and the type identifier of the business data;
extracting business data corresponding to the type identifier of the business data from the order information;
determining sub-filling fields of the business data in a corresponding filling field according to a number of characters included in the business data and a size of a filling field corresponding to the filling field identifier; and
filling the business data into the corresponding sub-filling fields in the contract template according to a preset character adjustment rule to generate a corresponding first contract file.

A generation apparatus of a contract includes:
an obtaining module, configured to obtain order information and obtain a contract template corresponding to the order information;
the obtaining module is further configured to obtain a filling field identifier in the contract template, and obtain a type identifier of business data corresponding to the filling field identifier according to a preset correspondence relationship between the filling field identifier and the type identifier of the business data;
a business data extracting module, configured to extract business data corresponding to the type identifier of the business data from the order information;
a sub-filling fields determination module, configured to determine sub-filling fields of the business data in a corresponding filling field according to a number of characters included in the business data and a size of a filling field corresponding to the filling field identifier; and
a first contract file generation module, configured to fill the business data into the corresponding sub-filling fields in the contract template according to a preset character adjustment rule to generate a corresponding first contract file.

A server, including a memory and a processor, the memory has computer-readable instructions stored therein which, when executed by the processor, cause the processor to perform:
obtaining order information and obtaining a contract template corresponding to the order information;
obtaining a filling field identifier in the contract template, and obtaining a type identifier of business data corresponding to the filling field identifier according to a preset correspondence relationship between the filling field identifier and the type identifier of the business data;
extracting business data corresponding to the type identifier of the business data from the order information;
determining sub-filling fields of the business data in a corresponding filling field according to a number of characters included in the business data and a size of a filling field corresponding to the filling field identifier; and
filling the business data into the corresponding sub-filling fields in the contract template according to a preset character adjustment rule to generate a corresponding first contract file.

One or more non-transitory computer-readable storage medium having computer-readable instructions stored thereon which, when executed by one or more processors, cause the one or more processors to perform:
obtaining order information and obtaining a contract template corresponding to the order information;
obtaining a filling field identifier in the contract template, and obtaining a type identifier of business data corresponding to the filling field identifier according to a preset correspondence relationship between the filling field identifier and the type identifier of the business data;
extracting business data corresponding to the type identifier of the business data from the order information;
determining sub-filling fields of the business data in a corresponding filling field according to a number of characters included in the business data and a size of a filling field corresponding to the filling field identifier; and
filling the business data into the corresponding sub-filling fields in the contract template according to a preset character adjustment rule to generate a corresponding first contract file.

The details of at least one embodiment of the present disclosure will be presented with reference to the following drawings and description. Other characteristic and advantages of the present disclosure will be more apparent from the specification, drawings and claims.

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

Figure 1:
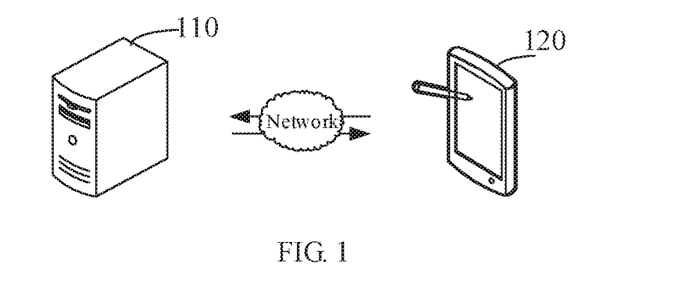
FIG. 1 is a schematic diagram of an application environment of a generation method of a contract according to an embodiment.

FIG. 1 is a schematic diagram of an application environment of a generation method of a contract according to an embodiment. As shown in FIG. 1, the server 110 communicates with the terminal 120 through a network. The server 110 obtains order information, and obtains a contract template corresponding to the order information. Further, the server 110 obtains a filling field identifier in the contract template, and obtains a type identifier of business data corresponding to the filling field identifier according to the correspondence relationship between the preset filling field identifier and the type identifier of the business data. The server 110 extracts the business data corresponding to the type identifier of the business data from the order information, and according to the number of characters included in the business data and the size of the filling field corresponding to the filling field identifier, sub-filling fields of the business data in the corresponding filling field are determined. Further, the server 110 fills the business data into the corresponding sub-filling field in the contract template according to a preset character adjustment rule of the sub-filling fields to generate the corresponding first contract file. Further, the server 110 may transmit the generated first contract file to the terminal 120.

It is understood that the terminal 120 includes, but is not limited to, various personal computers, smart phones, tablet computers, notebook computers, portable wear devices, self-service call terminals, etc., just to name a few.

Figure 2:
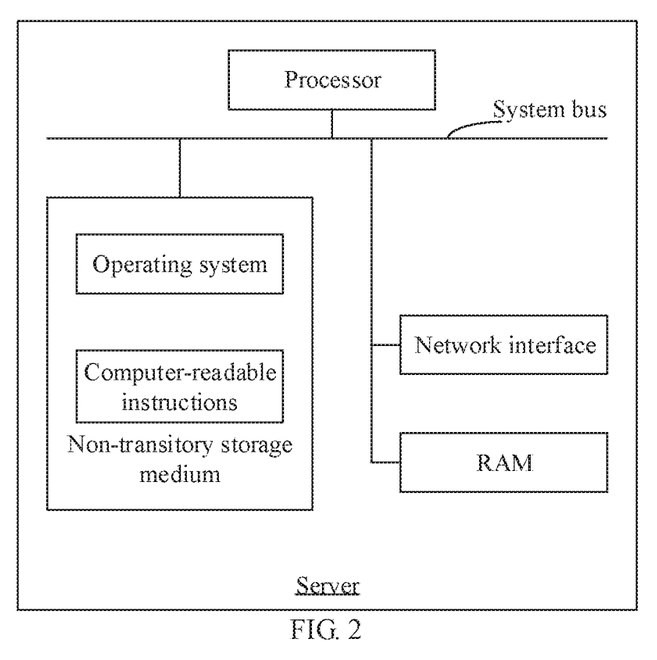
FIG. 2 is a block diagram of a server according to an embodiment.

FIG. 2 is a block diagram of a server according to an embodiment, which includes a processor, a non-transitory storage medium, a memory, and a network interface connected through a system bus. The non-transitory storage medium of the server stores an operating system and computer readable instructions that, when executed, may cause the processor to perform a generation method of a contract. The processor of the server is configured to provide computation and control capabilities to support the operation of the entire server. The memory of the server may have computer-readable instructions stored therein which, when executed by the processor, cause the processor to perform a generation method of a contract. The network interface of the server is configured for network communication, for example, transmitting the generated first contract file to a terminal or the like.

A person skilled in the art should understand, FIG. 2 is exemplary to show the parts of the structure relevant to the embodiments of the present disclosure and does not limit the server where the present disclosure is applied; the particular server may include more or fewer components, be combined with other components, or have a different component arrangement.

Figure 3:
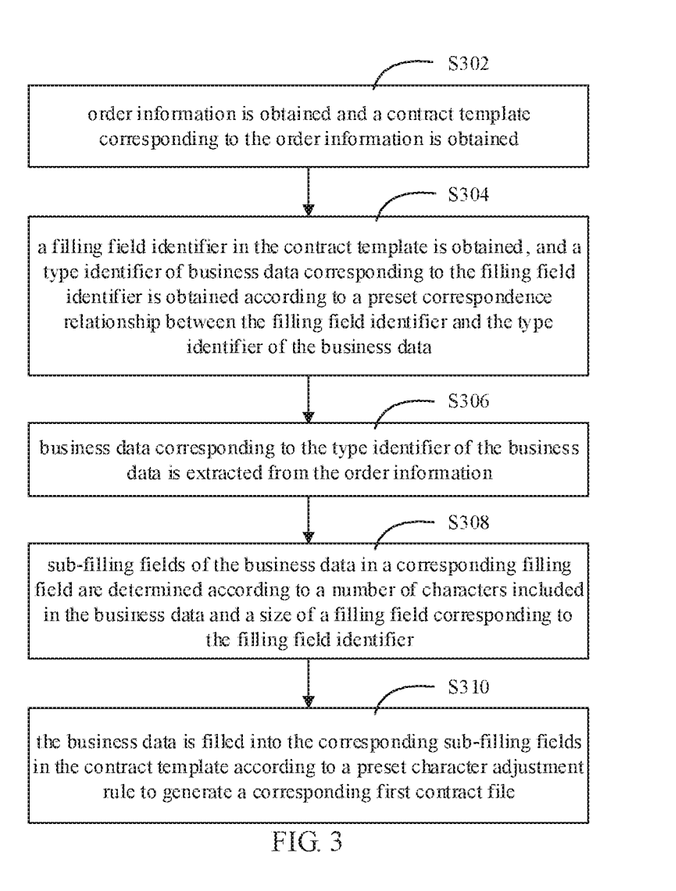
FIG. 3 is a flowchart of a generation method of a contract according to an embodiment.

As shown in FIG. 3, in an embodiment, a generation method of a contract is provided, which is described, as an example, being applied to the server shown in FIG. 1 or FIG. 2. The method specifically includes the following steps:

In step S302: order information is obtained and a contract template corresponding to the order information is obtained.

In the embodiment, the server obtains the order information. Specifically, the server may automatically obtain order information from the database to generate a corresponding contract file. Alternatively, the user submits the order in the terminal interface, and the terminal sends the submitted order information to the server.

Further, the server obtains the contract template corresponding to the order information. The obtained contract template includes at least one filling field. Further, the "filling field" refers to an editable and/or populated area that is pre-inserted into the initial contract template. The final contract template is combined from the filling field and the initial contract template together. The format of the initial contract template may be an editable format such as a word format or a non-editable format such as a Portable Document Format (PDF).

It will be appreciated that the final contract template combined from the field and the initial contract template in a non-editable format together may also be in a non-editable format. Generally, the contract management platform needs to use contract files in non-editable format (such as the PDF format), so after conventional contract templates in Word format are filled with business data, manual conversion to contract files in non-editable format, such as PDF, is required, which is very inefficient. What is being configured herein is directly the contract template in the non-editable format and including the filling field, and after the business data is filled in the filling field, the contract file is directly generated, thereby saving the step of manually converting the format, and improving the generation efficiency of the contract file.

In an embodiment, the server analyzes the order number in the order information, extracts characters of a preset position in the order number, and determines a city identifier corresponding to the order information according to the extracted characters. A correspondence relationship between the city identifier and the contract template identifier is preset in the configuration file of the server, and according to the correspondence relationship, the contract template identifier corresponding to the city identifier is obtained, and the contract template corresponding to the order information is determined according to the obtained contract template identifier. And at least one filling field is included in the obtained contract template.

In an embodiment, one city identifier uniquely corresponds to one contract template identifier, the contract template identifier uniquely corresponding to the city identifier is the target contract template identifier, and the contract template corresponding to the contract template identifier is obtained, that is, the contract template corresponding to the order information.

In another embodiment, the contract template identifier corresponding to the city identifier is at least one, the step of the determining of the contract template corresponding to the order information according to the contract template identifier includes: loan body information and guarantee company information are extracted from the order information; the contract template identifier corresponding to the extracted loan body information and the guarantee company information from the at least one contract template identifier is looked up as a target contract template identifier; and the contract template corresponding to the target contract template identifier is obtained.

In the embodiment, one city identifier corresponds to one or more contract template identifiers. Under the city level, a plurality of contract template identifiers corresponding to the city are further divided according to the loan body and the guarantee company in advance, the correspondence relationship under the city level and between each contract template identifier and the loan body and the guarantee company is established in the server. The server further extracts the loan body information and the guarantee company information from the order information, in combination with the correspondence relationship, the server looks up a contract template identifier corresponding to the extracted loan body information and the guarantee company information from the at least one contract template identifier as a target contract template identifier. Further, a contract template corresponding to the target contract template identifier is obtained.

For example, the corresponding contract template identifiers under the city A are 1, 2, 3, and 4, the loan body n1 and the guarantee company m1 correspond to the contract template identifier 1, the loan body n1 and the guarantee company m2 correspond to the contract template identifier 2, the loan main body n2 and the guarantee company m2 correspond to the contract template identifier 3, and the loan main body n2 and the guarantee company m1 correspond to the contract template identifier 4. If the loan body extracted from the order information is n2 and the guarantee company extracted from the order information is m2, the corresponding contract template identifier is 3.

In step S304: a filling field identifier in the contract template is obtained, and a type identifier of business data corresponding to the filling field identifier is obtained according to a preset correspondence relationship between the filling field identifier and the type identifier of the business data.

In the embodiment, the server obtains the filling field identifier in the contract template. The filling field identifier is configured to uniquely identify the filling field in the contract template.

Further, a correspondence relationship between the filling field identifier and the type identifier of the business data is preset in the server, and according to the correspondence relationship, the type identifier of the business data corresponding to the filling field identifier in the contract template is obtained. The type of the business data includes at least one of the customer name, the name of the organization, the loan amount, the term, the contract starting date, the collateral details, the loan body information, and the guarantee company.

In step S306: business data corresponding to the type identifier of the business data is extracted from the order information.

Further, the server extracts the business data corresponding to the type identifier of the business data from the order information. For example, the filling field identifier is r1, the type identifier of the corresponding business data is c, and c is an identifier for the customer name, and the customer name corresponding to c is obtained.

In step S308: sub-filling fields of the business data in a corresponding filling field are determined according to a number of characters included in the business data and a size of a filling field corresponding to the filling field identifier.

In particular, in an embodiment, it may be that the size of the area to be occupied by a single character is preset in the server, the size of the area to be occupied by the business data is determined accord to the size of the area to be occupied by the single character and the number of characters included in the business data. Then, according to the preset area selection rule, the sub-filling fields corresponding to the size of the area to be occupied are selected from the filling field, that is, the sub-filling fields of the business data in the filling field. The preset area selection rule may be at least one of selecting by the center, the left, the right, the upper, and the lower.

Figure 4:
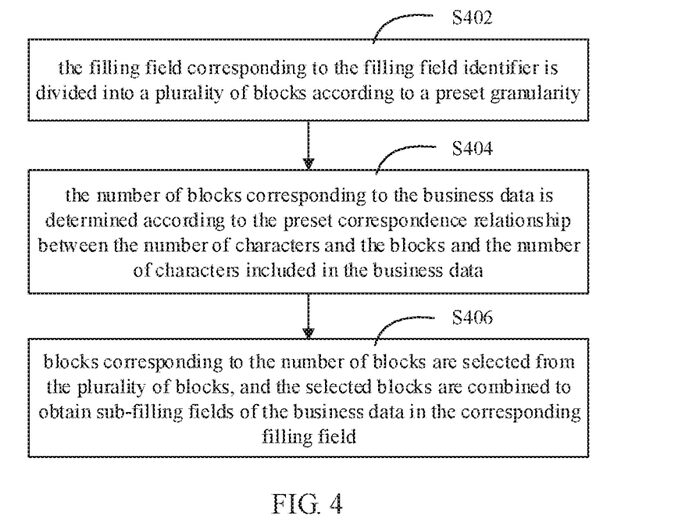
FIG. 4 is a flow chart of a method of determining sub-filling fields according to an embodiment.

In another embodiment, as shown in FIG. 4, the determining of sub-filling fields of the business data in the corresponding filling field according to the number of characters included in the business data and the size of the filling field corresponding to the filling field identifier (the sub-filling fields determining step) includes:

In step S402: the filling field corresponding to the filling field identifier is divided into a plurality of blocks according to a preset granularity.

In the embodiment, the server divides the filling field corresponding to the filling field identifier into a plurality of blocks according to a preset granularity.

The preset granularity may be a granularity in unit of a size of an area occupied by one or more characters.

In step S404: the number of blocks corresponding to the business data is determined according to the preset correspondence relationship between the number of characters and the blocks and the number of characters included in the business data.

Further, the correspondence relationship between the number of characters and the blocks is preset in the server. It will be appreciated that a single block may correspond to one or more characters. According to the correspondence relationship, the server may determine the number of blocks corresponding to the business data according to the number of characters included in the business data. For example, if a block corresponds to 5 characters and the number of characters included in the business data is 18 characters, it can be determined that the number of blocks corresponding to the business data is 4.

In step S406: blocks corresponding to the number of blocks are selected from the plurality of blocks, and the selected blocks are combined to obtain sub-filling fields of the business data in the corresponding filling field.

In the embodiment, the server selects blocks corresponding to the number of blocks from a plurality of blocks, and obtains sub-filling fields of the business data in the corresponding filling field by combining the selected blocks.

Further, it may be that a block selection rule is preset in the server. The block selection rule includes at least one of selecting by the center, the upper, the lower, the left, or the right, for the block. The server selects blocks corresponding to the number of blocks from a plurality of blocks according to a preset block selection rule.

In the embodiment, the filling field is divided into a plurality of blocks with a preset granularity, and the number of blocks corresponding to the business data are determined according to the number of characters in the business data, blocks corresponding to the number of blocks are selected from a plurality of blocks to be combined to obtain sub-filling fields corresponding to the business data and in the filling field. The specific filling positions of the business data in the filling field can be determined dynamically. Furthermore, compared with determining the sub-filling fields with reference to the entire large filling fields, the positions of the determined sub-filling fields can be more flexible by combining the blocks into sub-filling fields. Because, when the sub-filling field is determined with reference to the entire large filling field, the required field size is usually selected according to the fixed starting positions, so that the positions of the selected sub-filling fields are relatively rigid, singular, and lack of typesetting. However, by combining the blocks into the sub-filling fields, the positions of the determined sub-filling fields are more flexible because the blocks can be selected instead of fixed starting positions.

In step S310: the business data is filled into the corresponding sub-filling fields in the contract template according to a preset character adjustment rule to generate a corresponding first contract file.

Further, the server fills the business data into the corresponding determined sub-filling fields in the contract template according to the preset character adjustment rule to generate the corresponding first contract file. The preset character adjustment rule includes a preset number of single-line characters and/or a rule of automatic line wrapping.

It is should be understood that the "first" in the first contract file herein is intended to distinguish the "second contract file" hereinafter, and is not limitative in terms of size, authority, order, etc.

In the embodiment, the server obtains the order information, and obtains the contract template corresponding to the order information; obtains filling field identifier in the contract template, and obtains a type identifier of business data corresponding to the filling field identifier according to a preset correspondence relationship between the filling field identifier and the type identifier of the business data; extracts the business data corresponding to the type identifier of the business data from the order information; determines sub-filling fields of the business data in the corresponding filling field according to the number of characters included in the business data and the size of the filling field corresponding to the filling field identifier; fills the business data into corresponding sub-filling fields in the contract template according to a preset character adjustment rule to generate a corresponding first contract file. That is, it is equivalent to setting a contract template including a large filling field, and when generating contract files of different orders, it is only necessary to dynamically determine sub-filling fields required for the business data according to the number of characters of the business data in the order. Thereby effecting that the contract template is applicable to the business data whose number of character is within the preset range, compared with the conventional method of setting the corresponding contract template according to the filling starting position and the number of filling characters of the business data, the use rate of the contract template is greatly improved.

Figure 5:
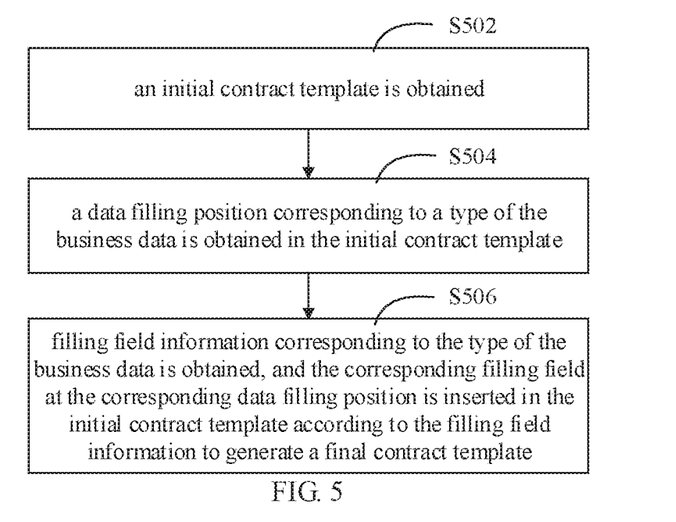
FIG. 5 is a flowchart of a generation method of a contract template according to an embodiment.

As shown in FIG. 5, in an embodiment, before the step of acquiring the order information, a contract template generation step is further included, which specifically includes the following steps:

In step S502: an initial contract template is obtained.

In the embodiment, the initial contract template is preset in the server. The format of the initial contract template may be an editable format, such as a Word format, or a non-editable format, such as a PDF format. It is understood that a non-editable format is a format in which the content of the file itself cannot be modified. The server obtains the preset initial contract template.

In step S504: a data filling position corresponding to a type of the business data is obtained in the initial contract template.

At least one type of business data is included in the initial contract template. As described, the type of business data includes at least one of the customer name, the organization name, the loan amount, the term, the contract starting date, the collateral details, the loan body information, and the guarantee company.

The types of business data are set with corresponding data filling positions in the initial contract template.

The server gets the data filling position corresponding to the type of business data in the initial contract template.

In step S506: filling field information corresponding to the type of the business data is obtained, and the corresponding filling field at the corresponding data filling position is inserted in the initial contract template according to the filling field information to generate a final contract template.

In the embodiment, a correspondence relationship between the type of the business data and the filling field information is preset in the server, and according to the correspondence relationship, the server obtains the filling field information corresponding to the type of the business data.

Further, the server inserts the corresponding filling field in the corresponding data filling position in the initial contract template according to the obtained filling field information to generate the final contract template. That is, the server may insert the corresponding filling field into the data filling position corresponding to the type of the business data in the initial contract template according to the filling field information corresponding to the type of the business data. Specifically, the server can call the insert function to insert the filling field into the corresponding data filling position.

Further, the final contract template is combined by the inserted filling field and the initial contract template.

It can be understood that when the types of the business data are multiple, the server obtains the filling field information respectively corresponding to the types of the business data. Then, according to each filling field information, the corresponding filling field is inserted into each corresponding data filling position in the initial contract template.

That is, multiple filling fields may be inserted into an initial contract template, and multiple filling fields may be included in the final contract template.

Figure 6:
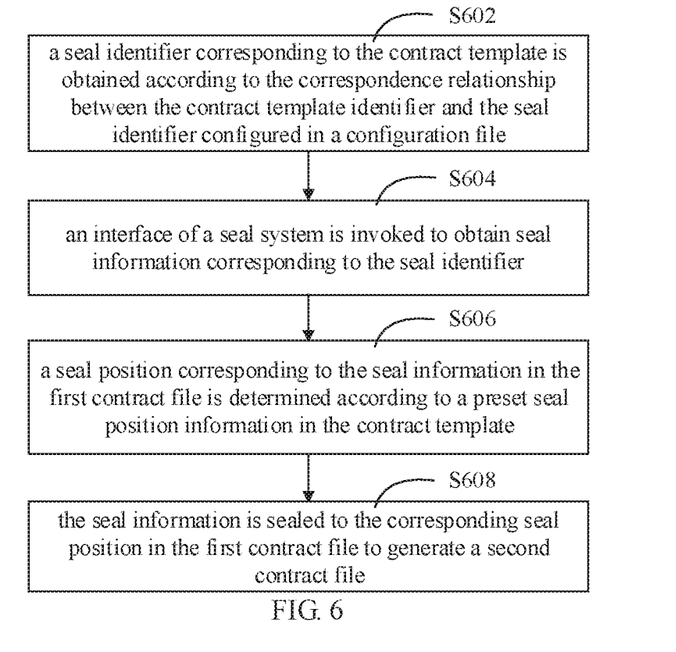
FIG. 6 is a flowchart of a generation method of a second contract file according to an embodiment.

As shown in FIG. 6, in an embodiment, the method further includes a second contract file generating step, specifically including the following steps:

In step S602: a seal identifier corresponding to the contract template is obtained according to the correspondence relationship between the contract template identifier and the seal identifier configured in a configuration file.

In the embodiment, the correspondence relationship between the contract template identifier and the seal identifier is configured in the configuration file pre-stored in the server. According to the correspondence relationship, the server obtains the seal identifier corresponding to the contract template. Specifically, the server obtains the contract template identifier corresponding to the contract template, and then obtains the seal identifier corresponding to the contract template identifier according to the correspondence relationship between the preset contract template identifier and the seal identifier. The obtained seal identifier is the seal identifier corresponding to the contract template.

In step S604: an interface of a seal system is invoked to obtain seal information corresponding to the seal identifier.

Further, the server may invoke the interface of the seal system to obtain the seal information corresponding to the seal identifier from the seal system.

In step S606: a seal position corresponding to the seal information in the first contract file is determined according to a preset seal position information in the contract template.

Specifically, the configuration file in which the seal position in the contract template is preset is stored in the server. According to the configuration file, the server determines the seal position corresponding to the seal information in the contract template. Since the first contract file is generated from the contract template filled with the business data, it is also possible to determine the seal position corresponding to the seal information in the first contract file.

In step S608: the seal information is sealed to the corresponding seal position in the first contract file to generate a second contract file.

Further, the server may seal the obtained seal information to a corresponding seal position in the first contract file to generate a second contract file.

In the embodiment, according to the correspondence relationship between the contract template identifier and the seal identifier configured by the configuration file, the seal information can be automatically sealed into the first contract file without printing the first contract file and manually sealing the same, the efficiency is thereby improved. In addition, by configuring the correspondence relationship between the contract template identifier and the seal identifier through the configuration file, it is convenient to update the seal. When the seal is updated, it is only necessary to change the correspondence relationship between the contract template identifier and the seal identifier in the configuration file.

In an embodiment, the method further includes: a number of print copies corresponding to the second contract file is obtained according to a preset correspondence relationship between the contract template identifier and the number of print copies, a print request is sent to the printing system, the print request includes the number of print copies, and the printing system is caused to print the second contract file according to the number of print copies.

In the embodiment, the correspondence relationship between the contract template identifier and the number of print copies is also configured in the configuration file. According to the correspondence relationship, the server obtains the number of print copies corresponding to the contract template uniquely identified as the contract template. It can be understood that the second contract file is also generated according to the contract template, and the obtaining of the number of printed copies corresponding to the contract template is equivalent to obtaining the number of printed copies corresponding to the second contract file.

Further, the server may send a print request including the number of print copies to the printing system. The printing system prints the second contract file according to the number of printed copies.

In the embodiment, the correspondence relationship between the contract template and the number of printed copies is configured by the configuration file, so that an automatic control of the number of printed copies in printing is effected, the operation of manually inputting the number of printed copies is saved, and the printing efficiency of the contract file is improved.

Figure 7:
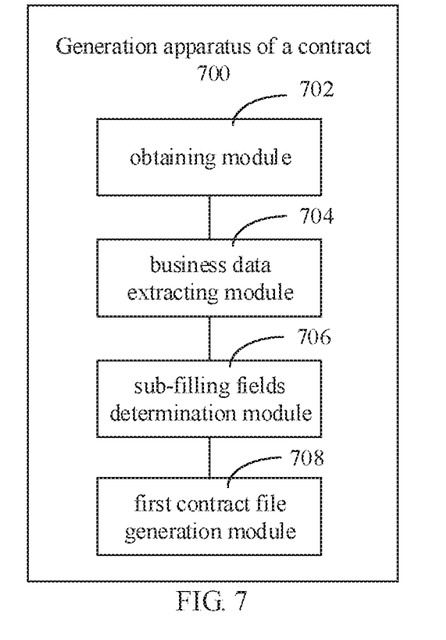
FIG. 7 is a block diagram of a generation apparatus of a contract according to an embodiment.

As shown in FIG. 7, a generation apparatus of a contract 700 is provided, which includes an obtaining module 702, a business data extracting module 704, sub-filling fields determination module 706, and a first contract file generation module 708:

The obtaining module 702 is configured to obtain order information and obtain a contract template corresponding to the order information.

The obtaining module 702 is further configured to obtain the filling field identifier in the contract template, and obtain the type identifier of business data corresponding to the filling field identifier according to a preset correspondence relationship between the filling field identifier and the type identifier of the business data.

The business data extracting module 704 is configured to extract business data corresponding to the type identifier of the business data from the order information.

The sub-filling fields determination module 706 is configured to determine sub-filling fields of the business data in a corresponding filling field according to a number of characters included in the business data and a size of a filling field corresponding to the filling field identifier.

The first contract file generation module 708 is configured to fill the business data into the corresponding sub-filling fields in the contract template according to a preset character adjustment rule to generate a corresponding first contract file.

In an embodiment, the sub-filling fields determination module 706 is further configured to divide the filling field corresponding to the filling field identifier into a plurality of blocks according to a preset granularity; determine the number of blocks corresponding to the business data according to the preset correspondence relationship between the number of characters and the blocks and the number of characters included in the business data; and select blocks corresponding to the number of blocks from the plurality of blocks, and combine the selected blocks to obtain sub-filling fields of the business data in the corresponding filling field.

In an embodiment, the obtaining module 702 is further configured to analyze the order number in the order information, extract a character of a preset position in the order number, and determine a city identifier corresponding to the order information according to the character extracted; obtain a contract template identifier corresponding to the city identifier according to a preset correspondence relationship between the city identifier and the contract template identifier; and determine the contract template corresponding to the order information according to the contract template identifier, the contract template includes at least one filling field.

In an embodiment, the contract template identifier corresponding to the city identifier is at least one. In the embodiment, the obtaining module 702 is further configured to extract loan body information and guarantee company information from the order information; look up for the contract template identifier corresponding to the extracted loan body information and the guarantee company information from the at least one contract template identifier as a target contract template identifier; and obtain the contract template corresponding to the target contract template identifier.

Figure 8:
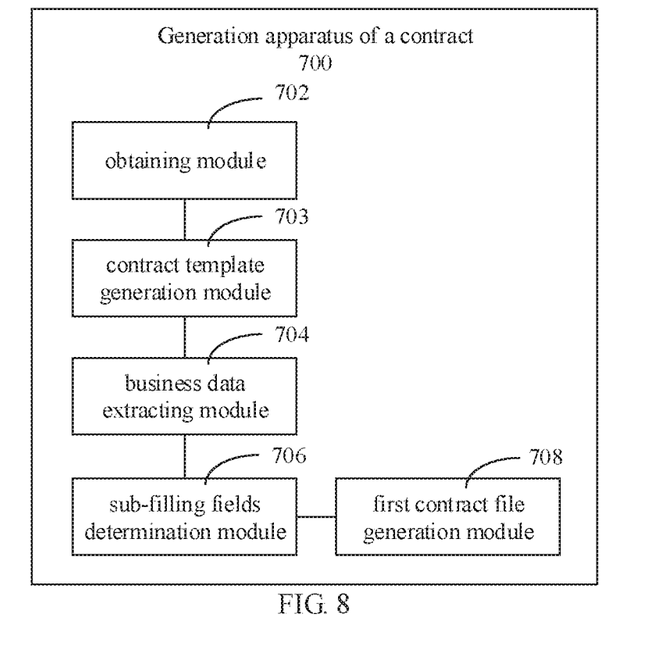
FIG. 8 is a block diagram of a generation apparatus of a contract according to another embodiment.

In an embodiment, the obtaining module 702 is further configured to obtain an initial contract template; obtain a data filling position corresponding to a type of the business data in the initial contract template. As shown in FIG. 8, in the embodiment, the apparatus further includes:

A contract template generation module 703, configured to obtain filling field information corresponding to the type of the business data, and insert the corresponding filling field at the corresponding data filling position in the initial contract template according to the filling field information to generate a final contract template.

Figure 9:
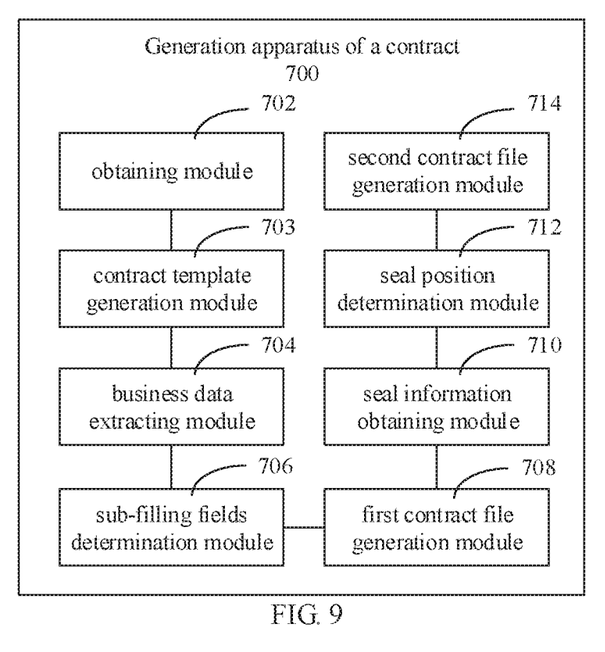
FIG. 9 is a block diagram of a generation apparatus of a contract according to still another embodiment.

In an embodiment, the obtaining module 702 is further configured to obtain a seal identifier corresponding to the contract template according to the correspondence relationship between the contract template identifier and the seal identifier configured in a configuration file. As shown in FIG. 9, in the embodiment, the apparatus further includes:

A seal information obtaining module 710, configured to invoke an interface of a seal system to obtain seal information corresponding to the seal identifier;

A seal position determination module 712, configured to determine a seal position corresponding to the seal information in the first contract file according to a preset seal position information in the contract template; and A second contract file generation module 714, configured to seal the seal information to the corresponding seal position in the first contract file to generate a second contract file.

The respective modules in the described generation apparatus of a contract may be implemented in whole or in part by software, hardware, and combinations thereof. The above-mentioned modules may be embedded in the form of hardware in or independent from the processor of the server, or may be stored in the memory of the server in the form of software so as to be called by the processor to perform the operations corresponding to the above respective modules.

One of ordinary skill in the art will appreciate that all or part of the flows of the method of implementing the embodiments described above may be accomplished by instructing related hardware by a computer program that may be stored in a computer-readable storage medium, the program, when executed, may include the flows of embodiments of the methods as described. The storage medium may be a non-transitory storage medium such as a disk, an optical disk, a read-only memory (ROM), or the like, or a random access memory (RAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific the embodiment of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A generation method of a contract, the method comprising:
    obtaining order information and obtaining a contract template in PDF corresponding to the order information;
    obtaining a filling field identifier in the contract template in PDF, and obtaining a type identifier of business data corresponding to the filling field identifier according to a preset correspondence relationship between the filling field identifier and the type identifier of the business data;
    extracting business data corresponding to the type identifier of the business data from the order information;
    determining sub-filling fields of the business data in a corresponding filling field according to a number of characters comprised in the business data and a size of a filling field corresponding to the filling field identifier; and
    filling the business data into the corresponding sub-filling fields in the contract template in PDF according to a preset character adjustment rule to generate a corresponding first contract file;
    wherein the step of determining of the sub-filling fields of the business data in the corresponding filling field according to the number of characters comprised in the business data and the size of the filling field corresponding to the filling field identifier comprises:
    dividing the filling field corresponding to the filling field identifier into a plurality of blocks according to a preset granularity;
    determining the number of blocks corresponding to the business data according to the preset correspondence relationship between the number of characters and the blocks and the number of characters comprised in the business data; and
    selecting blocks corresponding to the number of blocks from the plurality of blocks, and combining the selected blocks to obtain sub-filling fields of the business data in the corresponding filling field.

2. The method according to claim 1, wherein the obtaining of the contract template in PDF corresponding to the order information comprises:
    analyzing an order number in the order information, extracting a character of a preset position in the order number, and determining a city identifier corresponding to the order information according to the character extracted;
    obtaining a contract template identifier corresponding to the city identifier according to a preset correspondence relationship between the city identifier and the contract template identifier; and
    determining the contract template in PDF corresponding to the order information according to the contract template identifier, wherein the contract template in PDF comprises at least one filling field.

3. The method according to claim 2, wherein the contract template identifier corresponding to the city identifier is at least one;

the step of determining of the contract template in PDF corresponding to the order information according to the contract template identifier comprises:

extracting loan body information and guarantee company information from the order information;

looking up for the contract template identifier corresponding to the extracted loan body information and the guarantee company information from the at least one contract template identifier as a target contract template identifier; and obtaining the contract template in PDF corresponding to the target contract template identifier.

4. The method according to claim 1, prior to the obtaining of the order information, the method further comprising:

obtaining an initial contract template in PDF;

obtaining a data filling position corresponding to a type of the business data in the initial contract template; and obtaining filling field information corresponding to the type of the business data, and inserting the corresponding filling field at the corresponding data filling position in the initial contract template according to the filling field information to generate a final contract template in PDF.

5. The method according to claim 1, the method further comprising:

obtaining a seal identifier corresponding to the contract template in PDF according to the correspondence relationship between the contract template identifier and the seal identifier configured in a configuration file;

invoking an interface of a seal system to obtain seal information corresponding to the seal identifier;

determining a seal position corresponding to the seal information in the first contract file according to a preset seal position information in the contract template in PDF; and sealing the seal information to the corresponding seal position in the first contract file to generate a second contract file.

6. A generation apparatus of a contract, comprising a memory and one or more processors, wherein the one or more processors are configured to:

obtain order information and obtain a contract template in PDF corresponding to the order information; the obtaining module is further configured to obtain a filling field identifier in the contract template in PDF, and obtain a type identifier of business data corresponding to the filling field identifier according to a preset correspondence relationship between the filling field identifier and the type identifier of the business data;

extract business data corresponding to the type identifier of the business data from the order information;

determine sub-filling fields of the business data in a corresponding filling field according to a number of characters comprised in the business data and a size of a filling field corresponding to the filling field identifier;

fill the business data into the corresponding sub-filling fields in the contract template in PDF according to a preset character adjustment rule to generate a corresponding first contract file; and divide the filling field corresponding to the filling field identifier into a plurality of blocks according to a preset granularity; determine the number of blocks corresponding to the business data according to the preset correspondence relationship between the number of characters and the blocks and the number of characters comprised in the business data; and select blocks corresponding to the number of blocks from the plurality of blocks, and combine the selected blocks to obtain sub-filling fields of the business data in the corresponding filling field.

7. The apparatus according to claim 6, wherein the one or more processors are further configured to analyze the order number in the order information, extract a character of a preset position in the order number, and determine a city identifier corresponding to the order information according to the character extracted; obtain a contract template identifier corresponding to the city identifier according to a preset correspondence relationship between the city identifier and the contract template identifier; and determine the contract template in PDF corresponding to the order information according to the contract template identifier, wherein the contract template in PDF comprises at least one filling field.

8. The apparatus according to claim 6, wherein the one or more processors are further configured to obtain a seal identifier corresponding to the contract template in PDF according to the correspondence relationship between the contract template identifier and the seal identifier configured in a configuration file;

the apparatus further comprising:

a seal information obtaining module, configured to invoke an interface of a seal system to obtain seal information corresponding to the seal identifier;

a seal position determination module, configured to determine a seal position corresponding to the seal information in the first contract file according to a preset seal position information in the contract template in PDF; and a second contract file generation module, configured to seal the seal information to the corresponding seal position in the first contract file to generate a second contract file.

* * * * *